(12) United States Patent
Maurer et al.

(10) Patent No.: US 9,038,510 B2
(45) Date of Patent: May 26, 2015

(54) STEADY REST

(75) Inventors: Eckhard Maurer, Oberteuringen (DE); Jürgen Marquart, Markdorf (DE)

(73) Assignee: SMW-AUTOBLOK Spannsysteme GmbH, Meckenbeuren (DE)

( * ) Notice: Subject to any disclaimer, the term of this patent is extended or adjusted under 35 U.S.C. 154(b) by 557 days.

(21) Appl. No.: 13/506,118

(22) Filed: Mar. 28, 2012

(65) Prior Publication Data

US 2012/0255407 A1 Oct. 11, 2012

(30) Foreign Application Priority Data

Mar. 29, 2011 (EP) .................................... 11160213

(51) Int. Cl.
*B23Q 1/76* (2006.01)
*B24B 41/06* (2012.01)

(52) U.S. Cl.
CPC ........................................ *B23Q 1/76* (2013.01)

(58) Field of Classification Search
USPC ............ 82/162, 164; 451/408, 406; 192/56.1; 464/37; 279/108
See application file for complete search history.

(56) References Cited

U.S. PATENT DOCUMENTS

| 6,575,512 | B2* | 6/2003 | Moilanen et al. ............. 294/198 |
| 6,896,603 | B1* | 5/2005 | Lessway ...................... 451/408 |
| 7,032,944 | B2* | 4/2006 | Moilanen et al. ............. 294/203 |

FOREIGN PATENT DOCUMENTS

| EP | 1 302 275 | 4/2003 |
| EP | 0 554 506 | 8/2003 |
| EP | 2058084 A1 * | 5/2009 |

* cited by examiner

*Primary Examiner* — Daniel Howell
*Assistant Examiner* — Nicole N Ramos
(74) *Attorney, Agent, or Firm* — Pandiscio & Pandiscio

(57) ABSTRACT

A steady rest for centering a rotationally symmetrical workpiece in a space comprises: two housing halves arranged at a distance from one another and connected together, a plate-shaped middle piece arranged between the two housing halves, the middle piece mounted in the housing halves by means of an actuator piston so it can be moved in an axial movement direction to the workpiece, two linear guide grooves disposed in both opposite end faces of the middle piece, with the linear guide grooves running in a cross-shaped arrangement and at an angle to the movement direction of the middle piece, two outer steady rest arms, each of which has its free ends mounted in each of the linear guide grooves of the middle piece in a movable arrangement, and a middle steady rest arm attached to the middle piece between the outer steady rest arms.

12 Claims, 16 Drawing Sheets

STEADY REST

BACKGROUND OF THE INVENTION

1. Field of the Invention

The present invention relates to a steady rest for centering a rotationally symmetrical workpiece in a space

2. Description of the Prior Art

Steady rests of this kind have been used for decades for supporting rotationally symmetrical workpieces on machines tools. In particular, with heavy and long rotationally symmetrical workpieces, it is necessary to secure them centrally in the space by means of several steady rests spaced apart from one another in order to compensate for the bowing of the workpiece. The workpieces undergo bowing under their own weight, especially when they are rotating for machining involving metal cutting.

In the course of a plurality of machining steps, furthermore, additional machining forces are created which act on the workpieces and by means of which the central positioning of the workpiece could be changed. The steady rests of prior art are therefore intended to prevent the machining forces which act on the workpieces from giving rise to positional changes of this kind.

Machining involving metal cutting reduces the weight of the workpieces, as a result of which there is often also a change in position with the effect that the steady rests have to be reopened after a particular reduction in the weight of the workpieces in order to position the workpieces in the space so that the lengthways axis of the clamped workpiece runs along a straight line without deviating from the central axis.

A steady rest with an internal adjusting device for the central axis of the workpieces is disclosed in EP 0 554 506 B1. In order to achieve this, it is necessary for the two outer steady rest arms to be moved differently in relation to one another in order to achieve the vertical alignment of the workpiece. Horizontal centering of the workpiece is performed jointly with all three steady rest arms which make active contact with the workpiece not only at the same time but also at different times to one another.

EP 0 554 506 B1 proposes an adjusting device for vertical and horizontal alignment of the steady rest arms which has an extremely complex design.

It has proven to be a disadvantage of an adjusting device of this kind that it is very expensive to manufacture, and that the operation and mode of function of the adjusting device is complicated, such that specialist personnel are required who have the corresponding experience for undertaking the vertical and horizontal alignment of the steady rest arms.

DE 60208835 T2 or EP 1 302 275 A2 discloses a vertically adjustable steady rest, the steady rest arms of which have temporally discrete contact points on the contact surface of the workpiece by means of rocker and sliding elements which are mounted on the housing halves.

The sliding and rocker elements, also referred to as tappets, adjust the positions of the two outer steady rest arms in such a way that the control pins projecting from the steady rest arms enter into active contact with the contact surfaces, either simultaneously or with a time offset, and are therefore moved in the direction of the workpiece. Moving the sliding elements sideways to the movement direction of the middle piece and the angled surface formed on it causes the aforementioned adjustment of the feed sequences of the two outer steady rest arms to take place.

Although this state of the art has proven effective for adjusting the feed movement of the steady rest arms, it is however necessary to produce additional components and to work holes into the middle piece or the housing in which the sliding and rocker elements are mounted in a sliding arrangement. Production of such high-precision components is extremely costly, because the sliding and rocker elements must have identical contact surfaces running at an angle. If there are fault tolerances due to tolerance deviations, which are a result of the manufacturing process, then feed or adjustment of the two outer steady rest arms is not possible, because this would result in an unwanted movement of the workpiece.

SUMMARY OF THE INVENTION

Therefore, it is the task of the present invention to provide a steady rest of the aforementioned type which guarantees that high machining forces are reliably supported without the central positioning of the workpiece in the space being changed by these forces, and that at the same time the centering of the workpiece in the space can be adjusted in a quick and easy way by changing the position of the steady rest arms or the middle piece, without any complex adjusting steps being required for this.

The distance between the two guide strips and the workpiece can be variably adjusted within a certain limited range by a first half shell, and consequently the feed distances of the three steady rest arms can be adjusted so that the position of the workpiece in the space can be aligned in a horizontal direction or in the horizontal plane in such a way that the lengthways axis of the workpiece runs in line with the horizontal axis. Movement of a second half shell changes the positions of the two guide strips in opposite directions synchronously with one another in such a way that the control pins engaging in the control cams of the steady rest arms make contact with the control surfaces of the control cams, either at different times or simultaneously, with the result that the two outer steady rest arms make contact with the workpiece to be clamped either at exactly the same time or at different times, which has the effect that the vertical position of the workpiece can be adjusted by means of the movement of the second half shell transversally to the movement direction of the middle piece.

It is particularly advantageous for guide paths to be worked into the middle piece in parallel and at a distance from the lengthways axis of the middle piece, because this means the outer steady rest arms are positioned in a defined way by means of the guide pins if, namely, the control pins are pushed out of the control cams of the steady rest arms, with the effect that the position of the outer steady rest arms of the middle piece and the guide strips are permanently aligned with one another in the specified way.

As soon as the control pin engages in the control cams of the steady rest arms, they take over the positioning of the two outer steady rest arms in relation to the middle piece, with the effect that the steady rest arms are pulled inwards along the control surface of the control cams when the control pins of the guide strips make contact, as a result of which the free ends of the outer steady rest arms facing the workpiece are moved towards the workpiece.

The two sickle-shaped half shells can be moved variably and transversally to the movement direction of the middle piece by means of screws and compression springs, which means that even slight positional changes of the two half shells are sufficient to achieve adequate centering centering of the workpiece in the space as a result of the precise position determination of the three steady rest arms without the person adjusting the steady rest needing to have extensive professional experience, because simply clamping the workpiece and then measuring the position of the workpiece in the space makes it clearly apparent whether the workpiece should be moved in a horizontal and/or vertical plane, and what amount of movement is required in order to achieve central positioning of the workpiece in the space.

BRIEF DESCRIPTION OF THE DRAWINGS

The drawings show a sample embodiment configured in accordance with the present invention, the details of which are explained below. In the drawings.

DESCRIPTION OF THE PREFERRED EMBODIMENTS

Figure 1:
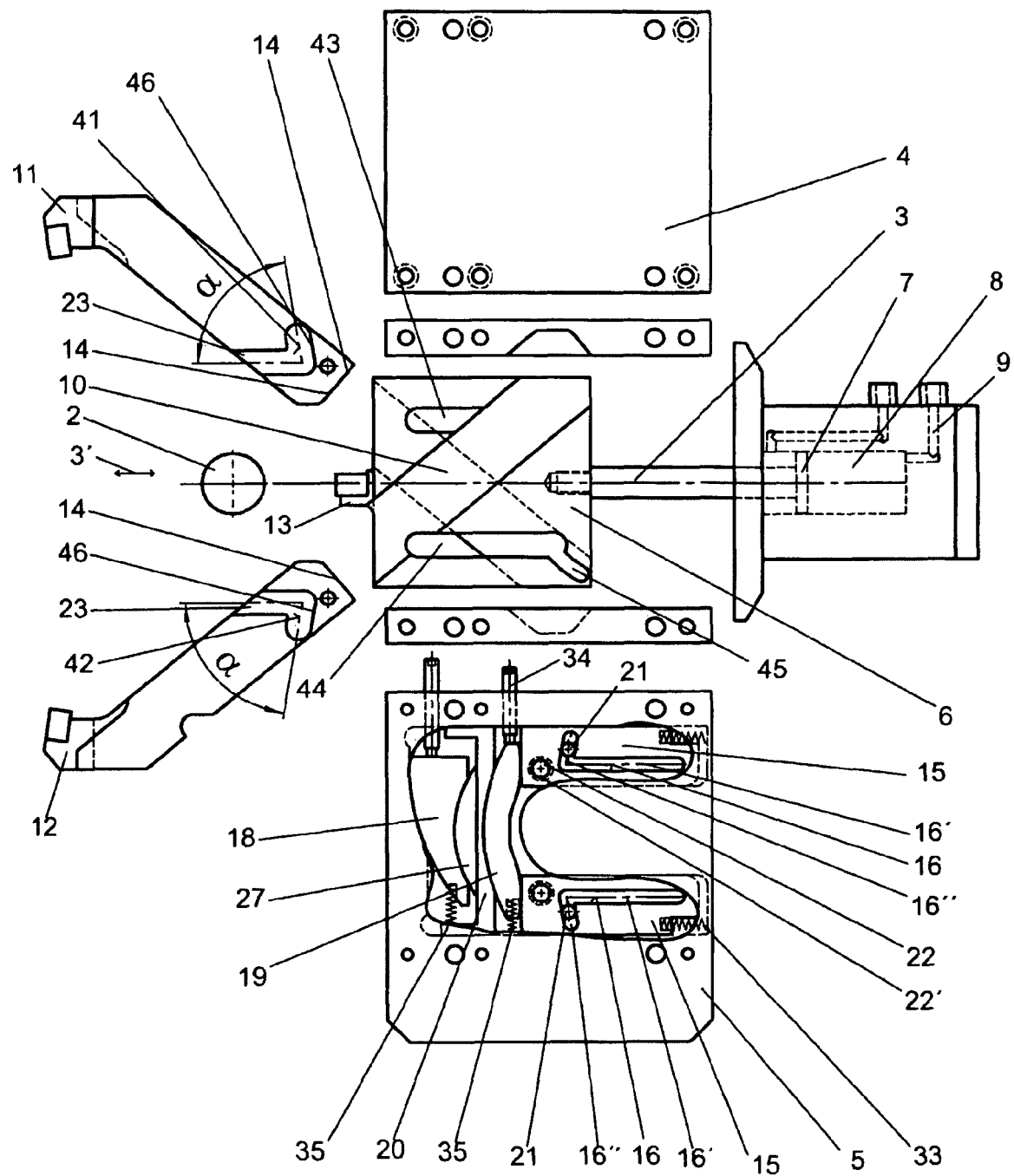
FIG. 1 is an exploded view of a steady rest with two housing halves, between which a plate-shaped middle piece is driven by an actuator piston, and three steady rest arms are allocated to the middle piece, by means of which a workpiece is centered in the space, and with two sickle shaped curved half shells inserted in one of the housing halves the shells being moved transversally in relation to the direction of movement of the middle piece.
Figure 2:
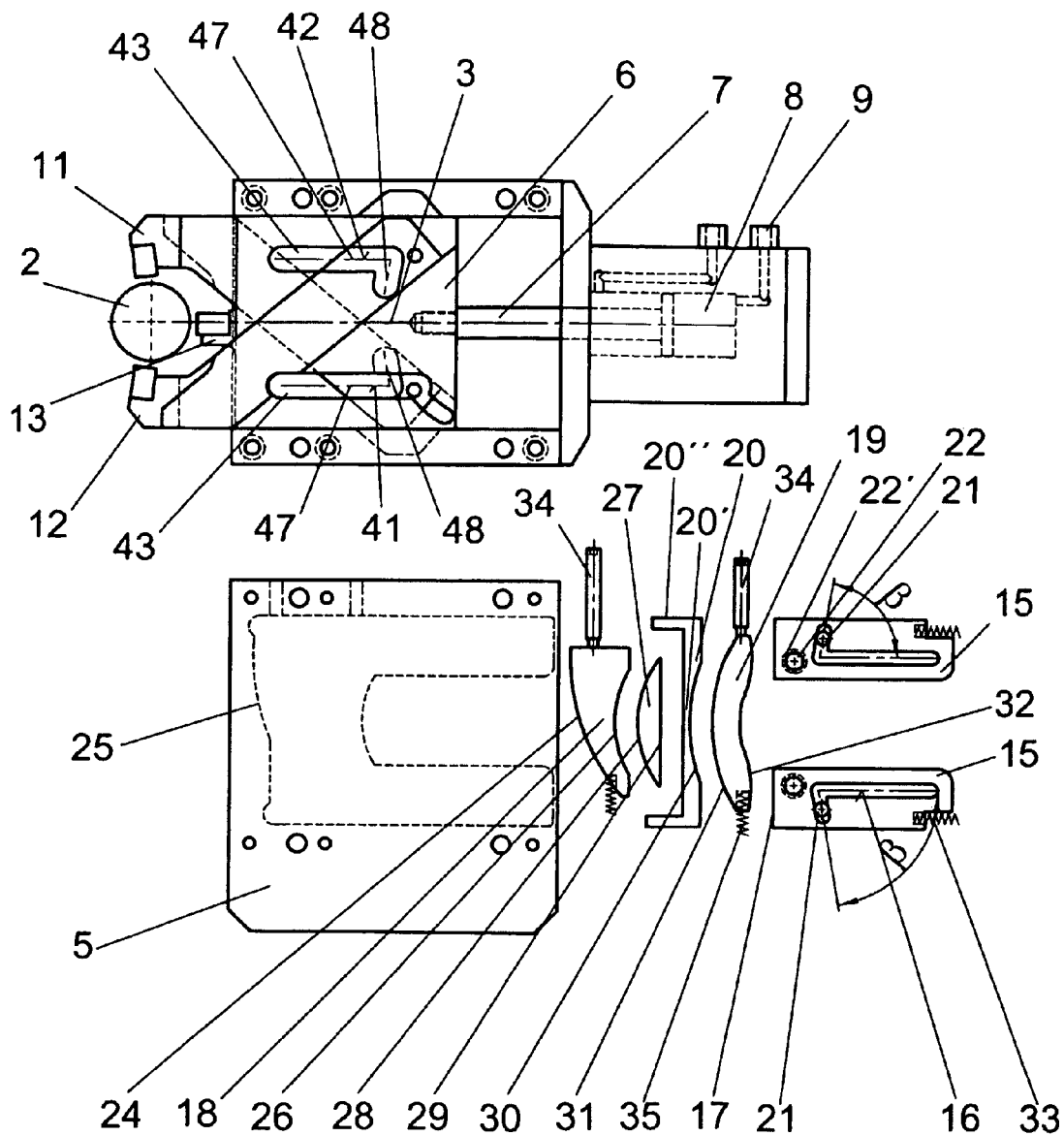
FIG. 2 shows the steady rest of FIG. 1, in an exploded view and in a partially assembled condition.

FIGS. 1 and 2 show a steady rest by means of which a rotationally symmetrical workpiece 2 is centered and held in a rotating arrangement in the space in such a way that the axis of rotation of the workpiece 2 does not if possible undergo any bowing out of the horizontal under its own weight and due to the machining forces acting on the workpiece 2. The axis of rotation of the workpiece 2 should accordingly be held in a particular position in the space by the steady rest.

The steady rest consists of two housing halves 4 and 5 which have a lengthways axis 3. A middle piece 6 is mounted between the two housing halves 4 and 5, can be moved axially, has its movement direction identified with the reference number 3' and runs in parallel with the lengthways axis 3 of the steady rest.

The middle piece 6 is connected to an actuator piston 7 by means of a screw/thread connection, for example. The actuator piston 7 runs in a pressure space 8 which can be filled, for example with hydraulic fluid, or evacuated by means of control lines 9, with the effect that the pressure space 8 has different pressure conditions, as a result of which the actuator piston 7 can be moved with a stroke motion. Consequently, the middle piece 6 can be driven by the actuator piston 7 in the movement direction 3' and can be moved up to the workpiece 2 or pulled away from it.

The middle piece 6 has two linear guide grooves 10 worked into it, which run towards one another in a cross shape on the two opposite large-surface end faces 6' of the middle piece 6. The two linear guide groves 10 are arranged at an angle, preferably an angle of about 10° to 30° in relation to the lengthways axis 3 of the steady rest.

Two steady rest arms 11 and 12 of the steady rest are inserted in the linear guide grooves 10 in a moveable arrangement. A middle steady rest arm 13 is directly attached to the middle piece 6 in between the two outer steady rest arms 11 and 12, with the effect that the middle piece 6 is arranged between the two outer steady rest arms 11 and 12. The three steady rest arms 11, 12 and 13 face towards the workpiece 2 to be clamped, and therefore they project both out of the middle piece 6 and out of the two housing halves 4 and 5. Moving the middle piece 6 towards the workpiece 2 therefore advances the three steady rest arms 11, 12 and 13 jointly up to the workpiece 2. During the advance movement of the middle piece 6, there is at first no relative movement of the two outer steady rest arms 11 and 12 in relation to the middle piece 6 in the linear guide groove 10.

Furthermore, two guide paths 43 and 44 are worked into the middle piece 6 and have a linear contour. One of the guide paths 43 emerges into one of the linear guide grooves 10 and the other guide path 44 has a void 45 which projects outward from the guide path 44 at an angle $\alpha$ of about 80°.

Each of the free ends 14 of the two outer steady rest arms 11 and 12 allocated to the middle piece 6 has a control cam 41 and 42 worked into it. The control cams 41 and 42 comprise two subsections 47 and 48. The first subsection 47 runs in parallel with the lengthways axis 3 of the steady rest and the second subsection 48 projects from the first subsection 47 at an angle $\beta$ of about 85° and forms a control surface 46 which is explained in more detail below. When the two outer steady rest arms 11 and 12 are mounted, the second subsection 48 points towards the interior, i.e. towards one another. The control cams 41 and 42 are chiefly aligned flush with the guide paths 43 and 44 of the middle piece 6.

Moreover, two guide strips 15 are arranged on the housing half 4 and run parallel to the lengthways axis 3 and at a distance from it. The guide strips 15 can also be arranged in sliding elements in the other housing half 5 or 4. The guide strips 15 are mounted so as to allow a slight amount of sliding in the housing half 4, with the effect that the position of the guide strips 15 can be changed relative the housing halves 4 and 5. The guide strips 15 are in contact with the housing halves 4 in the lengthways direction 3' of the steady rest, and are supported by the housing halves 4.

A control pin 22 is attached to each of the guide strips 15 and projects at right angles from each of the guide strips 15 into the inside of the housing halves 4 or 5. The control pin 22 has a roll 22' which is attached to the control pin 22 so that it can turn. The external diameter of the roll 22' exactly corresponds to the width of the corresponding control cam 41 and 42 in both the outer steady rest arms 11 and 12, because the roll 22' of the control pin 22 should project into the control cam 41 and 42 when clamped, thereby controlling the movement of the two outer steady rest arms 11 and 12 in a defined way.

Two half shells 18 and 19 are provided for the relative movement of the guide strips 15 and for positioning them. Both half shells 18 and 19 have a sickle-shaped, curved cross section, in order to have differently sized widths in relation to the movement direction 3' of the middle piece 6. The first half shell 18 has its curved outside 24 against a contact surface 25 of the housing half 5, and is supported by it in the movement direction 3'. The first half shell 18 can be moved at right angles to the movement direction 3' of the middle piece 6 by means of a screw 34. The opposite side of the first half shell 18 in relation to the screw 34 has a compression spring 35 arranged on it which exerts a counter-force against the force exerted by the screw 34, with the effect that the first half shell 18 is supported and fixed between the screw 34 and the compression spring 35.

The inside 26 of the first half shell 18 has a constant curve which serves as a stop for a compensation element 27. The first surface 28 of the compensation element 27 facing the first half shell 18 has a contour which is adapted to the contour of the inside of the first half shell 18; the second surface 29 of the compensation element 27 is configured flat and runs at right angles to the lengthways axis 3.

A U-shaped compensation arm 20 is provided on the second surface 29 of the compensation element 27. The compensation arm 20 consists of two legs 20" running in parallel to one another which are connected by means of a connecting web 20'. The two legs 20" are supported on the housing half 5 in parallel to the movement direction 3' of the middle piece 6.

The side of the connecting web 20' facing away from the compensation element 27 has a trough 30 worked into it, which has an inside contour with a curved cross section. The second half shell 19 is inserted into the trough 30 and its surface 31 facing towards the connecting web 20' is adapted to the inside contour of the trough 30.

The second half shell 19 has two end faces 32 each of which faces towards one of the two guide strips and has the guide strips 15 in contact with it, because these are pressed against the end faces 32 of the second half shell 19 by means of a coiled compression spring 33. As a result of the preload force exerted by the coiled pressure springs 33 that run in parallel to the lengthways axis 3 of the steady rest, the guide strips 15 are pressed towards the second half shell 19 with the effect that the second half shell 19 exerts a contact pressure force against the compensation arm 20, the compensation element 27 and thus on the first half shell 18. The first and second half shells 18 and 19, as well as the compensation element 27 and the compensation arm 20, are consequently arranged in series in relation to the movement direction 3' of the middle piece 6, and run at right angles to the lengthways axis 3.

Also, the second half shell 19 is moved by means of the screw 34 and a compression spring 35 in relation to the connecting web 20' or the compensation arm 20 at right angles to the lengthways axis 3, as a result of which the stop positions of the guide strips 15 can be changed synchronously to one another. This is explained in more detail below.

Figure 3A:
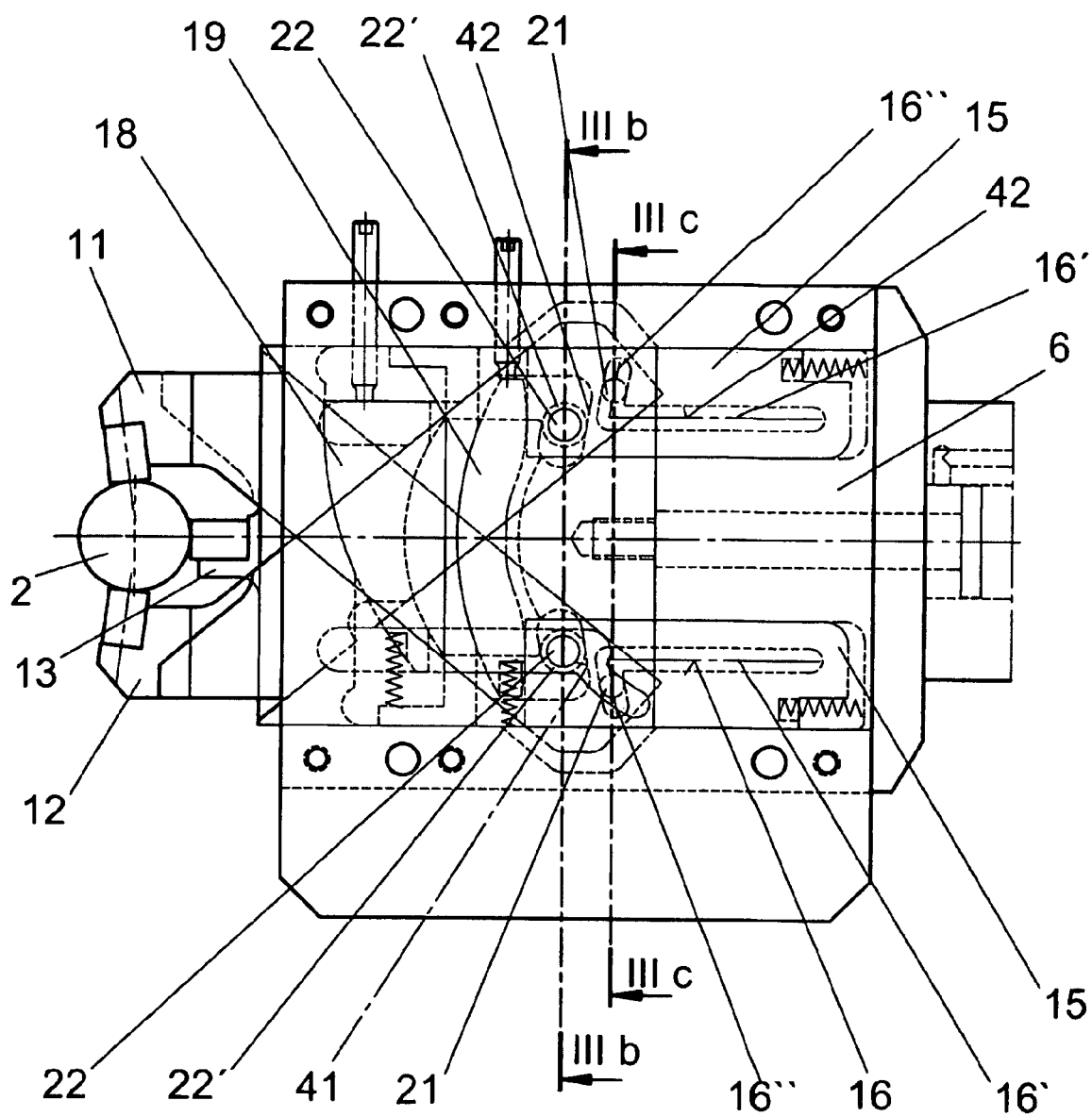
FIG. 3a shows the steady rest of FIG. 1, assembled and in the clamped condition of the workpiece.

FIG. 3a shows the assembled status of the steady rest, and shows that the three steady rest arms 11, 12 and 13 secure the workpiece in space. The first and second half shells 18 and 19 are each in their middle position in relation to the lengthways axis 3.

Figure 3B:
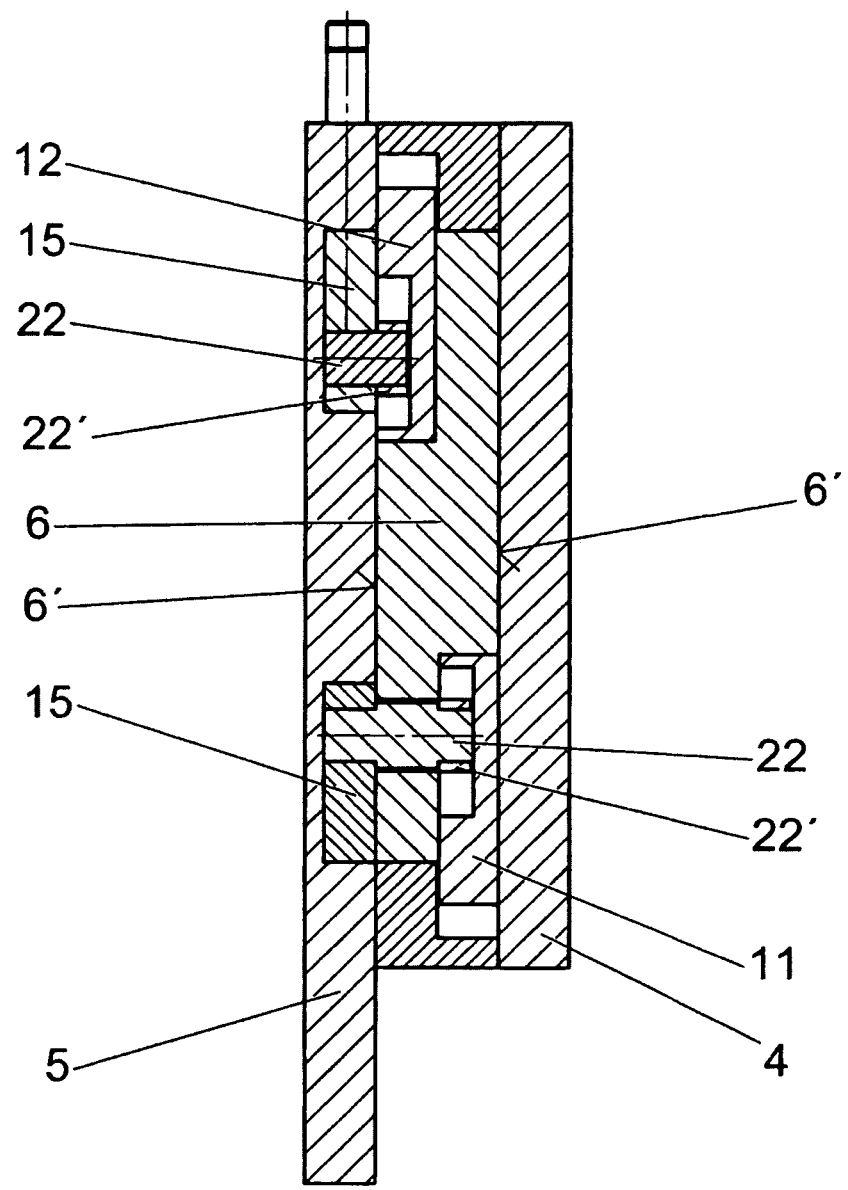
FIG. 3b shows the steady rest of FIG. 3a along a section line IIIb-IIIb.
Figure 3C:
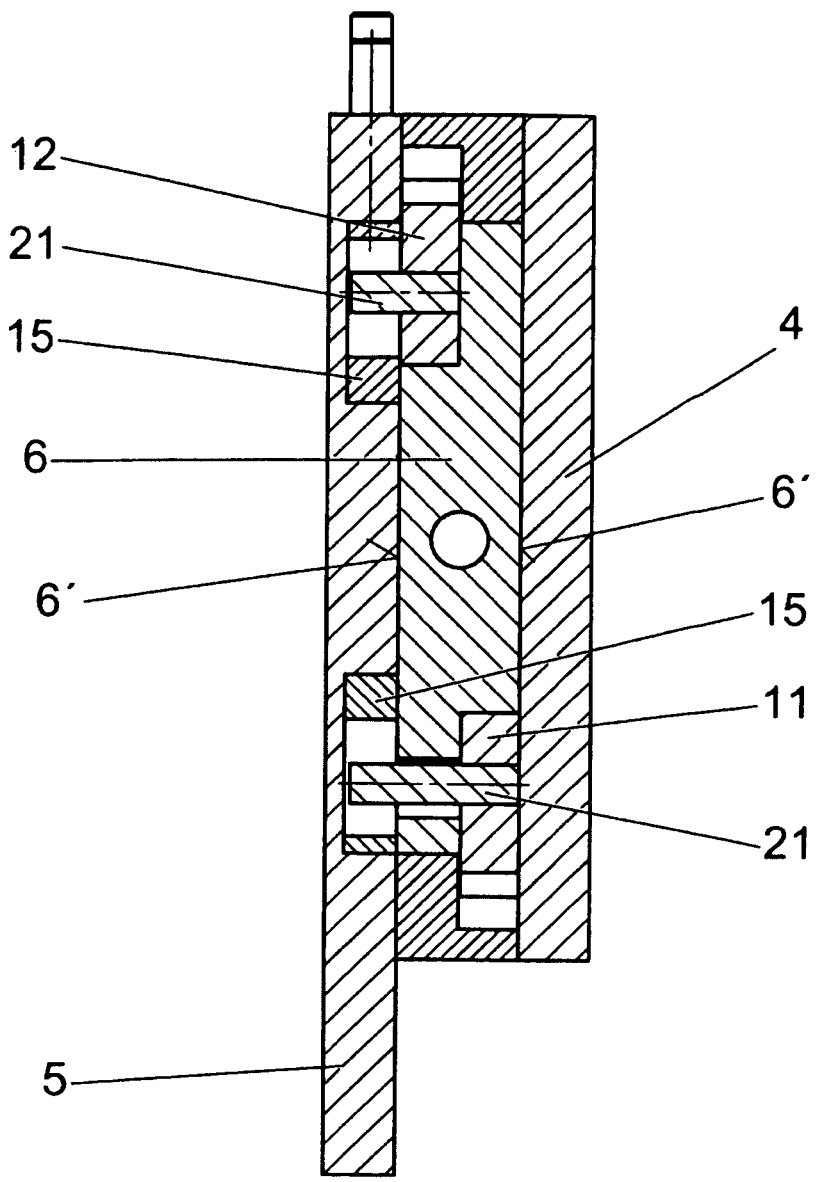
FIG. 3c shows the steady rest of FIG. 3a along a section line IIIc-IIIc.

Furthermore, FIGS. 3a, 3b and 3c show that there is a guide cam 16 worked into both guide strips 15 which is made up of two subsections 16' and 16". A guide pin 21 projecting at right angles from each free end 14 of the two outer steady rest arms 11 and 12 is inserted into the guide cam 16, and is mounted in the guide cam 16 in a movable arrangement. The guide pin 21 has the task of holding the two outer steady rest arms 11 and 12 reliably against the middle piece 6 by means of the guide strip 15, if and for as long as the control pin 22 is not pushed into the control cams 41 and 42 of the steady rest arms 11 and 12.

The second subsection 16" of the guide cam 16 projects outwards from the first subsection 16' at an angle of about 80°; there is play between the guide pin 21 and the guide cam 16, with the effect that the advance movement of the two outer steady rest arms 11 and 12 is not impeded when the control pin 22 has moved into the control cams 41 and 42.

Figure 4A:
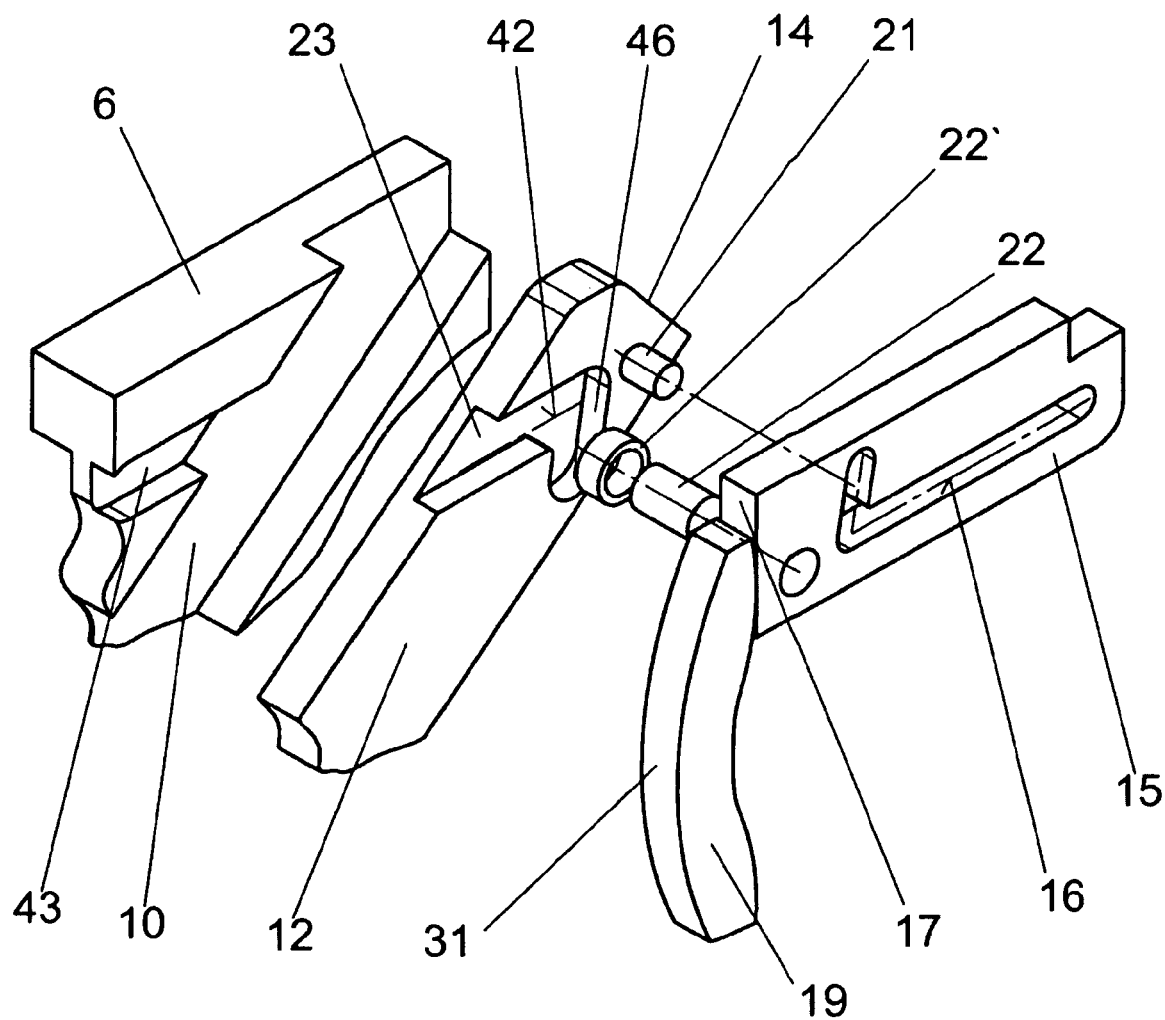
FIG. 4a shows the steady rest of FIG. 1, in an exploded view, with individual components magnified in an area of an upper outer steady rest arm portion.
Figure 4B:
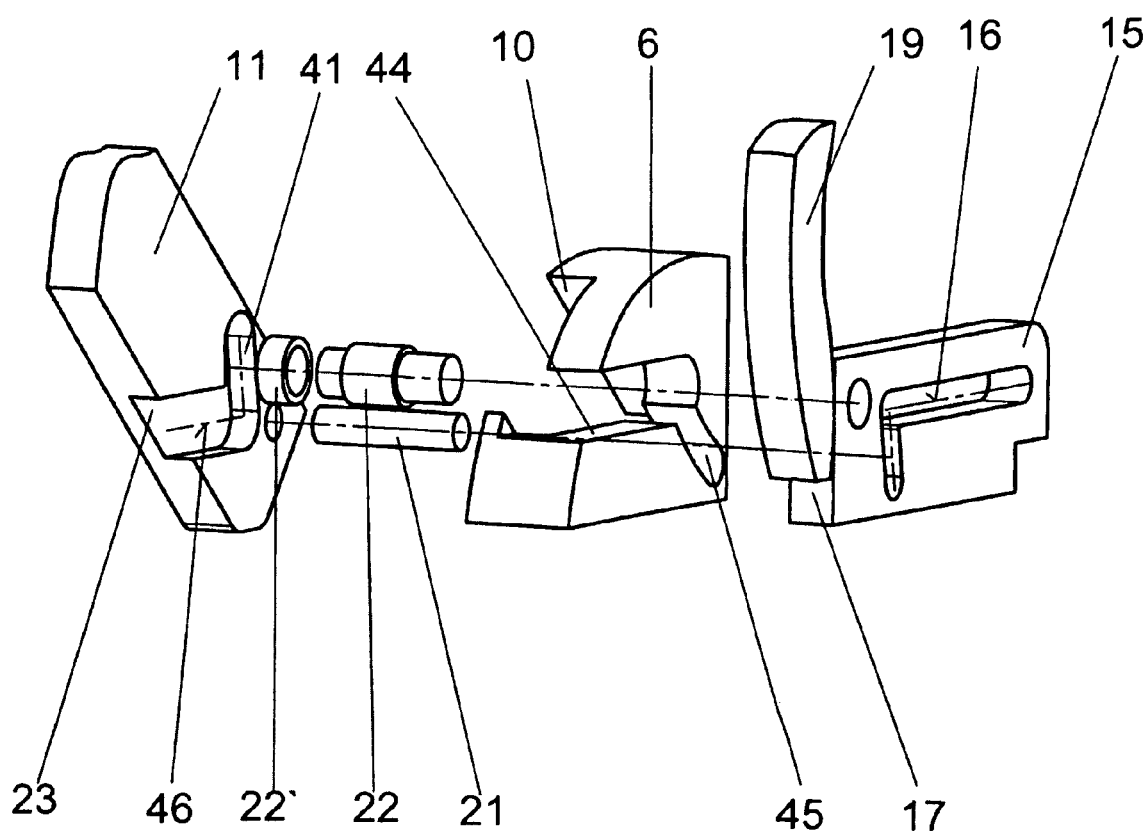
FIG. 4b shows the steady rest of FIG. 1, in an exploded and magnified view of a lower steady rest arm portion.

FIGS. 4a and 4b show the sandwich construction of the steady rest, the individual components of which, especially the middle piece 6, the two outer steady rest arms 11 and 12, the guide strips 15 and the half shells 18 and 19, are arranged on different planes running parallel with one another. As long as the two housing halves 4 and 5 are firmly connected together and enclose a sufficiently large cavity, the components mounted in the housing halves 4 and 5 in an axially movable arrangement can be moved towards the workpiece 2 or vice versa. For one thing, such a movement is required in order to define the advance paths of the middle piece exactly to the workpiece and, for another thing, it is needed for coordinating the stop positions of the two outer steady rest arms 11 and 12 synchronously with one another.

Figure 5A:
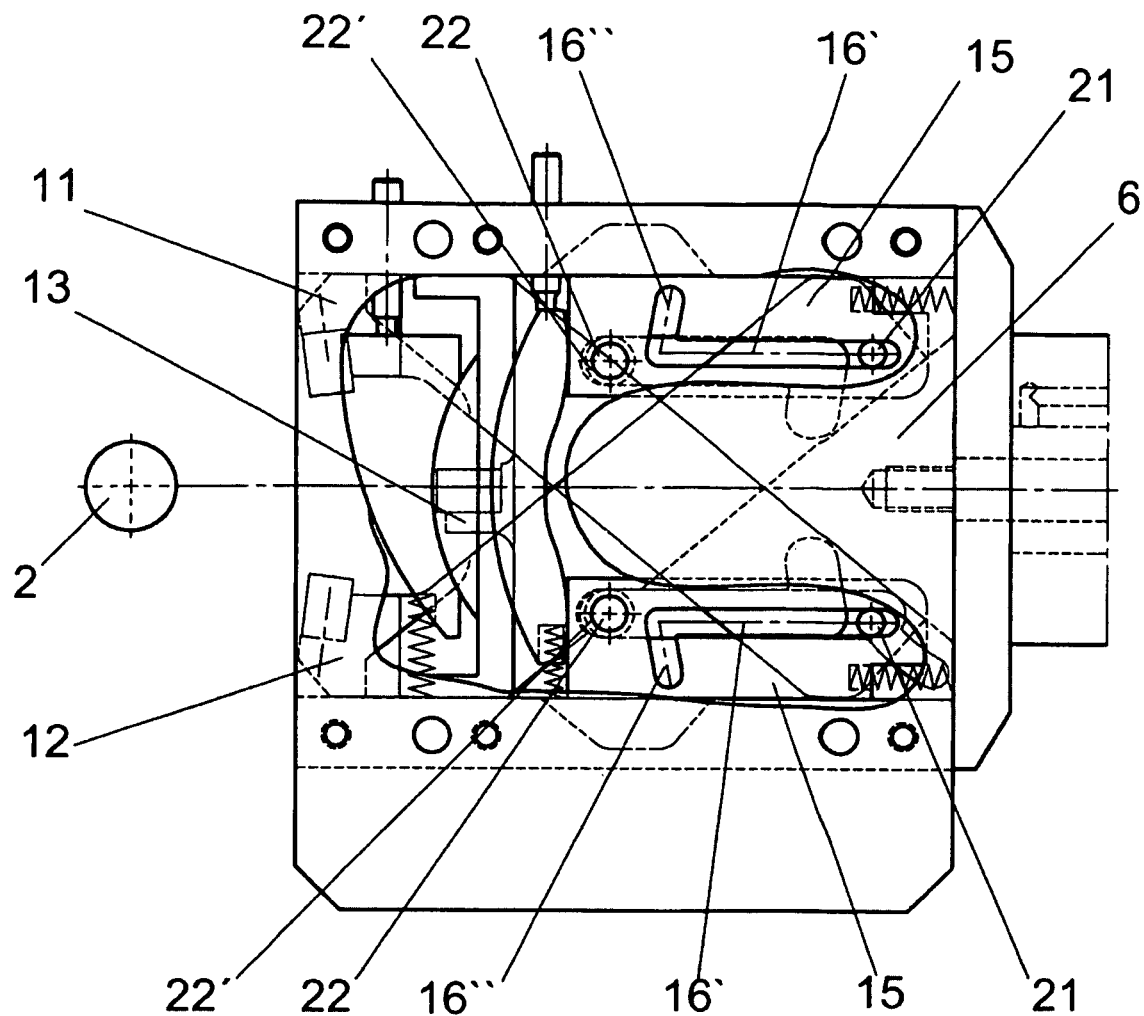
FIGS. 5a to 5e show the steady rest of FIG. 3a in operating conditions from an initial position through to a clamped condition.
Figure 5B:
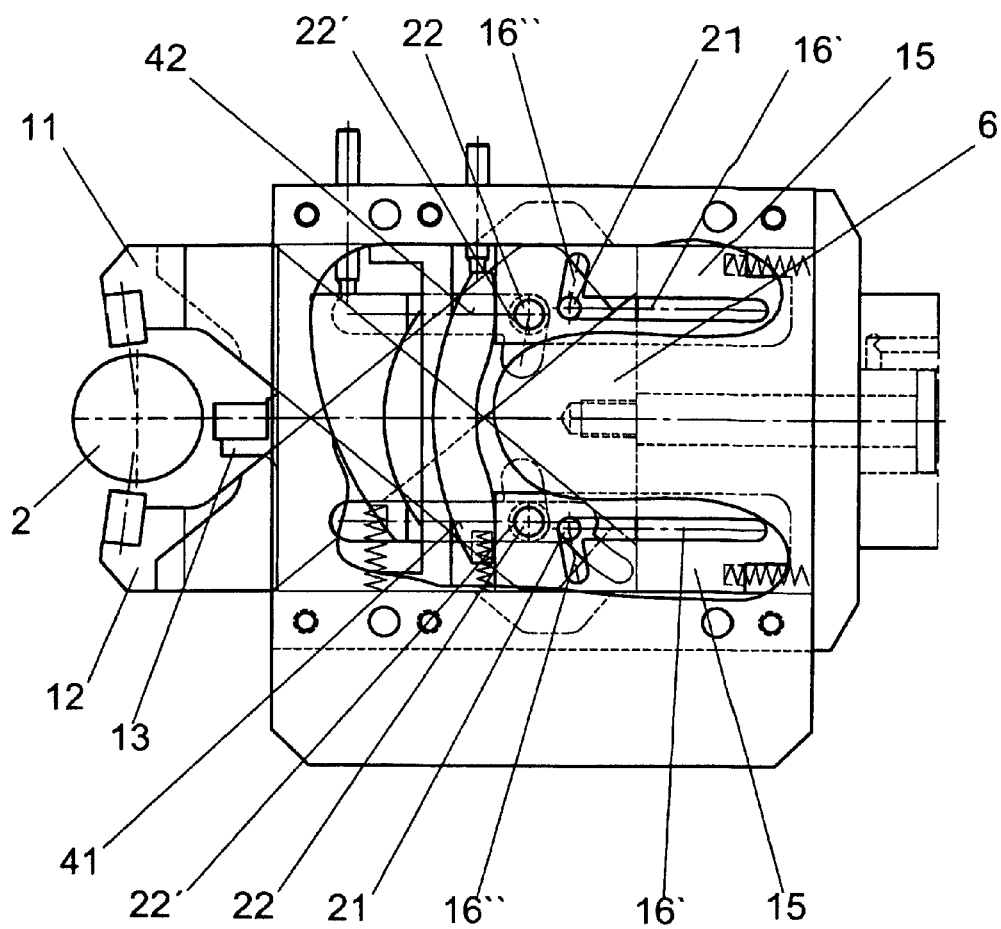

FIGS. 5a to 5e show the advance movement of the middle piece 6 in the direction of the workpiece 2. The starting position shown in FIG. 5a is translated into an intermediate position as shown in FIG. 5b by means of the drive of the middle piece 6 towards the workpiece 2. In this progress, the guide pins 21 have been moved axially in the guide strip 15 and the control pin 22 projects into the control cams 41 and 42 of the steady rest arms 11 and 12. The steady rest arms 11, 12 and 13 have a specific, equally sized, distance from the workpiece 2 and the control pins 22 are in contact with the control surface 46 of the two control cams 41 and 42.

Figure 5C:
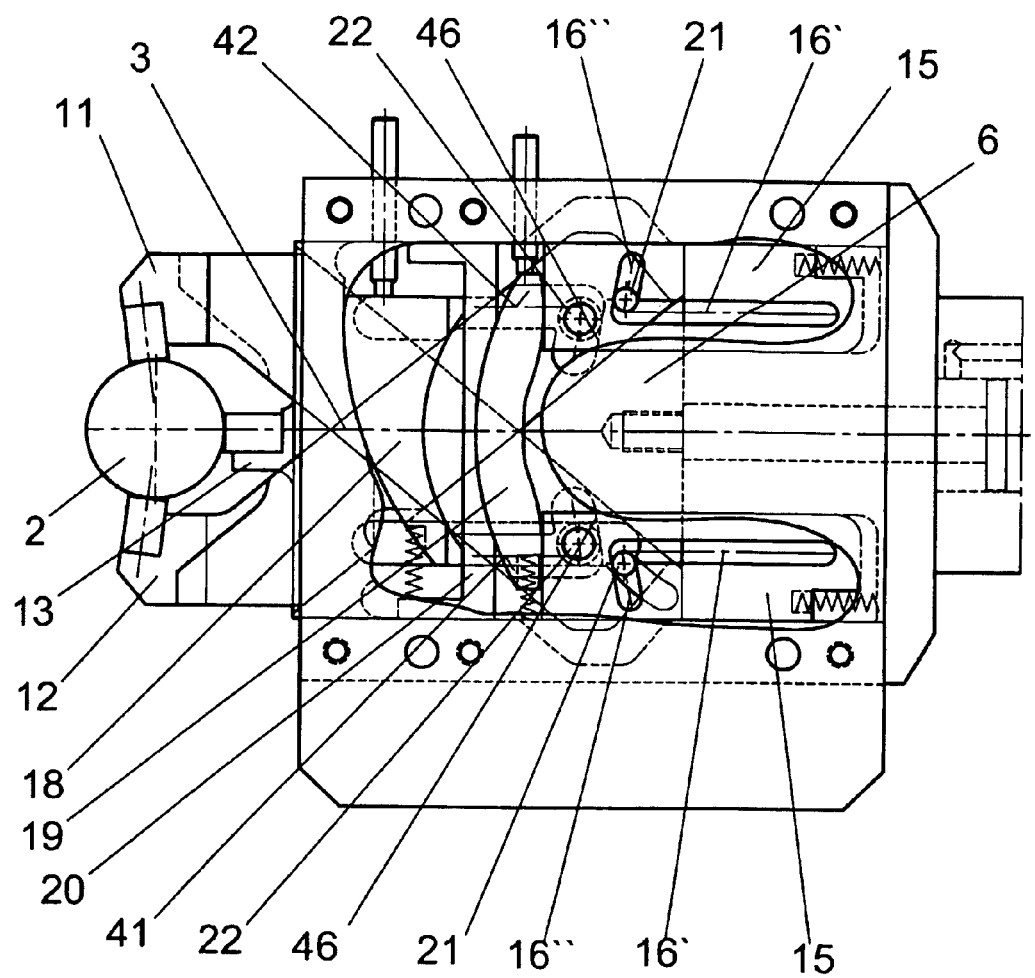

FIG. 5c shows the first active contact of the three steady rest arms 11, 12 and 13 with the workpiece 2. The position of the compensation arm 20 defined by the first half shell 18 limits the advance path of the middle piece 6 in the direction of the workpiece 2, and therefore represents a stop surface for it. The control pins 22 have consequently partially moved into the inwardly projecting second subsection 48 of the of the corresponding control cam 41 or 42, as a result of which each of the two outer steady rest arms 11 and 12 is moved outwards in relation to the middle piece 6 along the linear guide groove 10, so that the free ends of the two outer steady rest arms 11 and 12 facing the workpiece 2 are advanced to the workpiece 2.

Figure 5D:
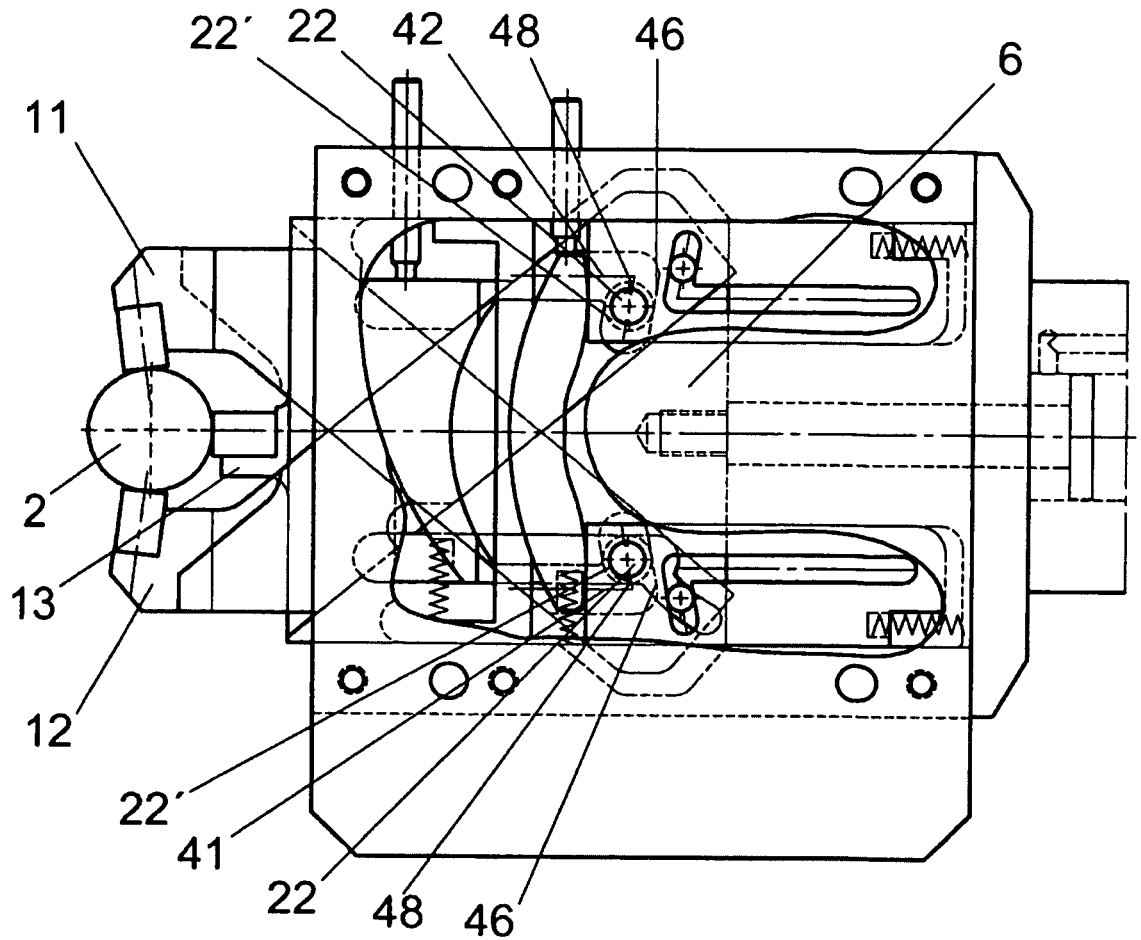
Figure 5E:
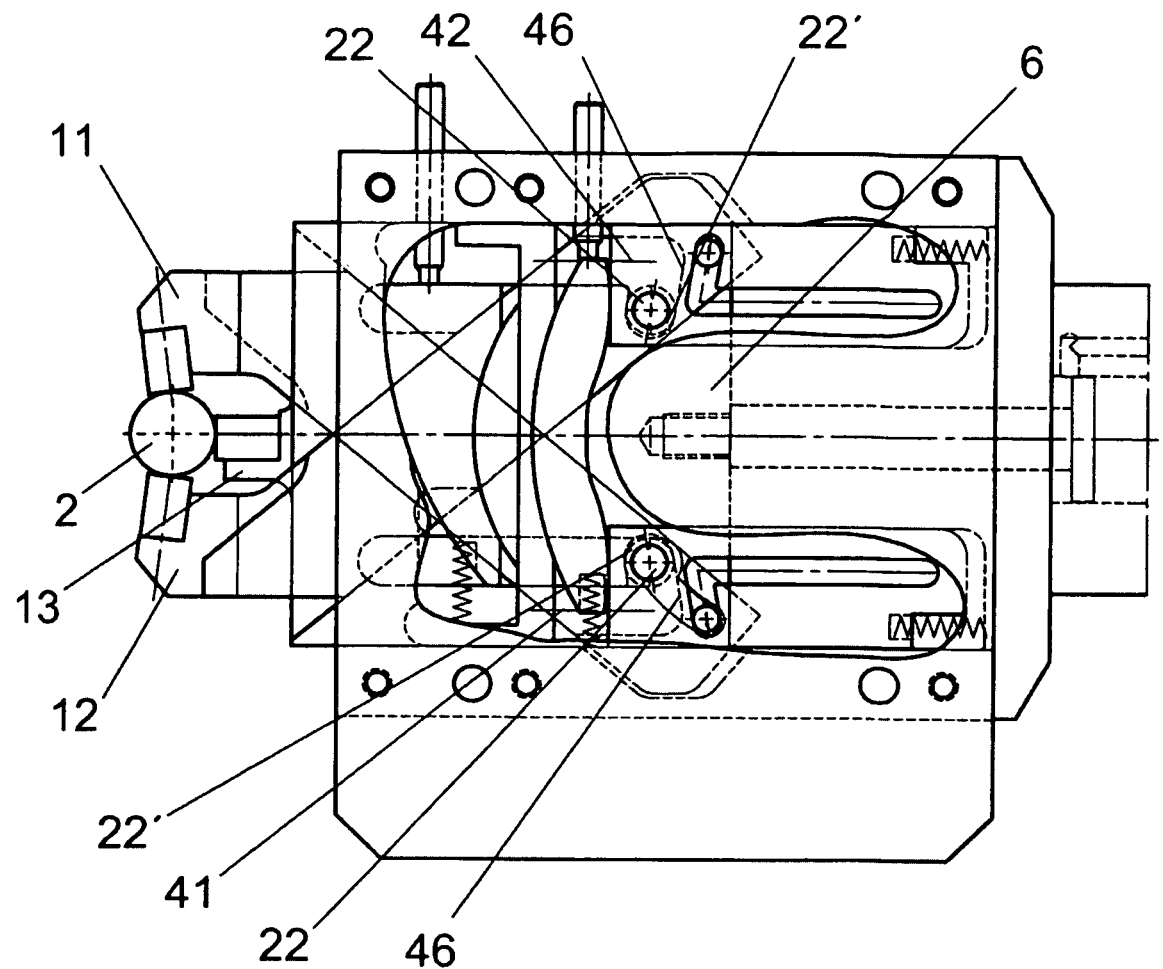

FIGS. 5d and 5e show the clamping movement of the steady rest arms 11, 12 and 13, because the control pins move further in towards the second subsection 48 of the corresponding control cam 41 and 42, as a result of which the steady rest arms 11 and 12 exert a defined clamping force on the workpiece 2. The middle steady rest arm 13 is pressed against the workpiece 2 synchronously with the outer steady rest arms 11 and 12 as a result of the axial advance movement of the middle piece 6, as a result of which all three steady rest arms 11, 12 and 13 exert a clamping force of equal magnitude on the workpiece 2.

Figure 6A:
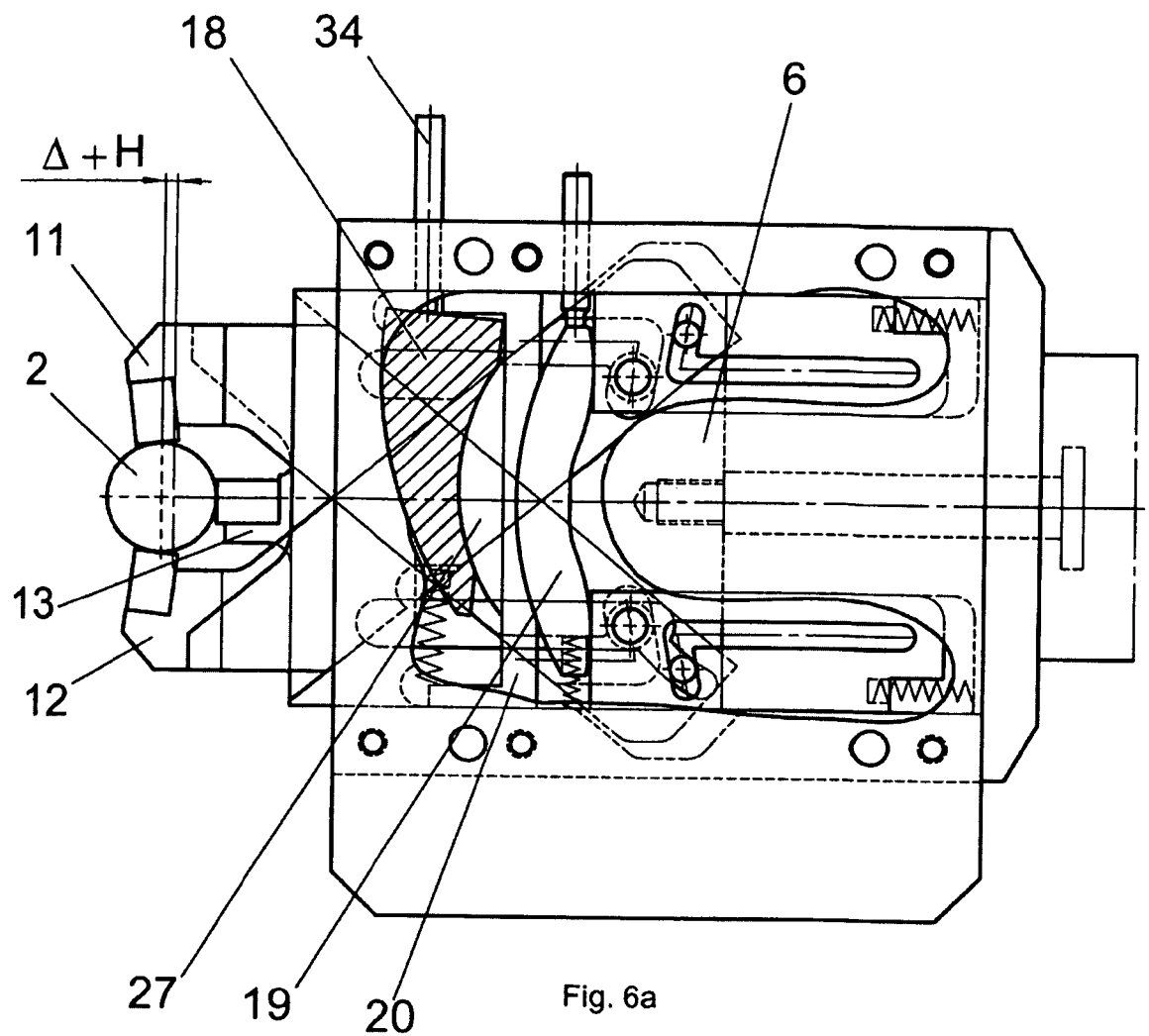
FIGS. 6a and 6b show the adjustment possibilities of the first half shell in the two housing halves shown in FIG. 3a for horizontal alignment of the steady rest arms, in each case in section.
Figure 6B:
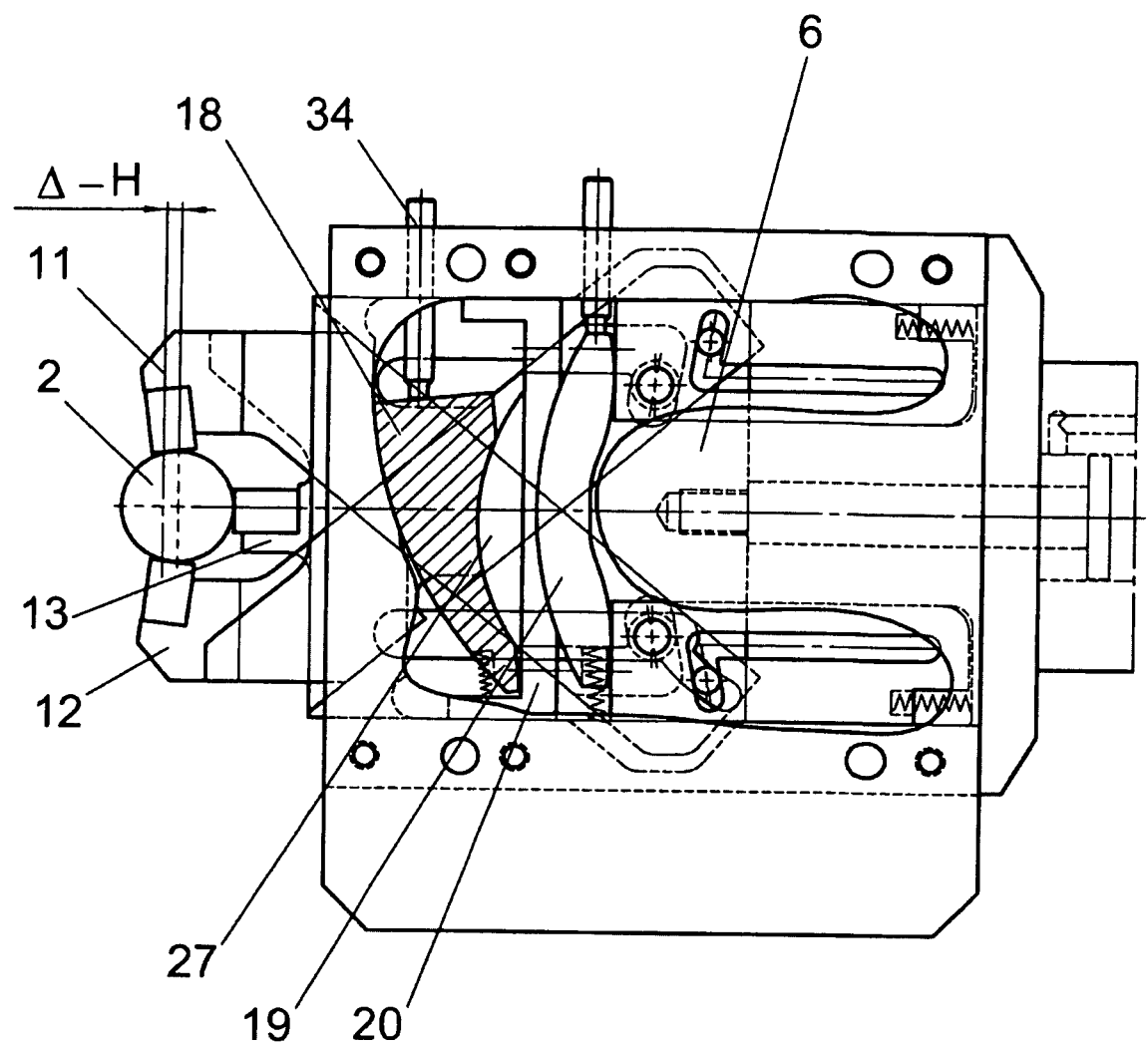

FIGS. 6a and 6b show the horizontal adjustment or horizontal positioning of the workpiece 2. For this purpose, the first half shell 18 is moved by the screw 34 transversally to the movement direction 3' of the middle piece 6. As a result of the sickle-shaped curved cross-sectional contour of the first half shell 18, the distance between the contact surface 25, the housing half 5 and the inside 26 of the first half shell 18 changes. This change in distance means that the advance path of the middle piece 6 is longer or shorter than the advance path of the middle piece 6 that is set in FIGS. 5a to 5e. As a result of the lengthening or shortening of the middle piece 6 in relation to the workpiece 2 to be clamped, the three steady rest arms 11, 12 and 13 enter into active contact with the workpiece 2 at an earlier or later stage. However, the advance movement of each of the steady rest arms 11, 12 and 13 is firmly coupled with the middle piece 6, with the effect that the advance speeds of the steady rest arms 11, 12 and 13 are equal and their distance from the workpiece 2 is identical.

Consequently, the position of the workpiece 2 changes in the space, although exclusively in the horizontal plane. This horizontal change of the workpiece is referred to schematically in FIG. 6*a* as Δ+H. FIG. 6*b* shows the opposite extreme position, and thus the movement of the workpiece 2 by the value Δ-H.

Figure 7A:
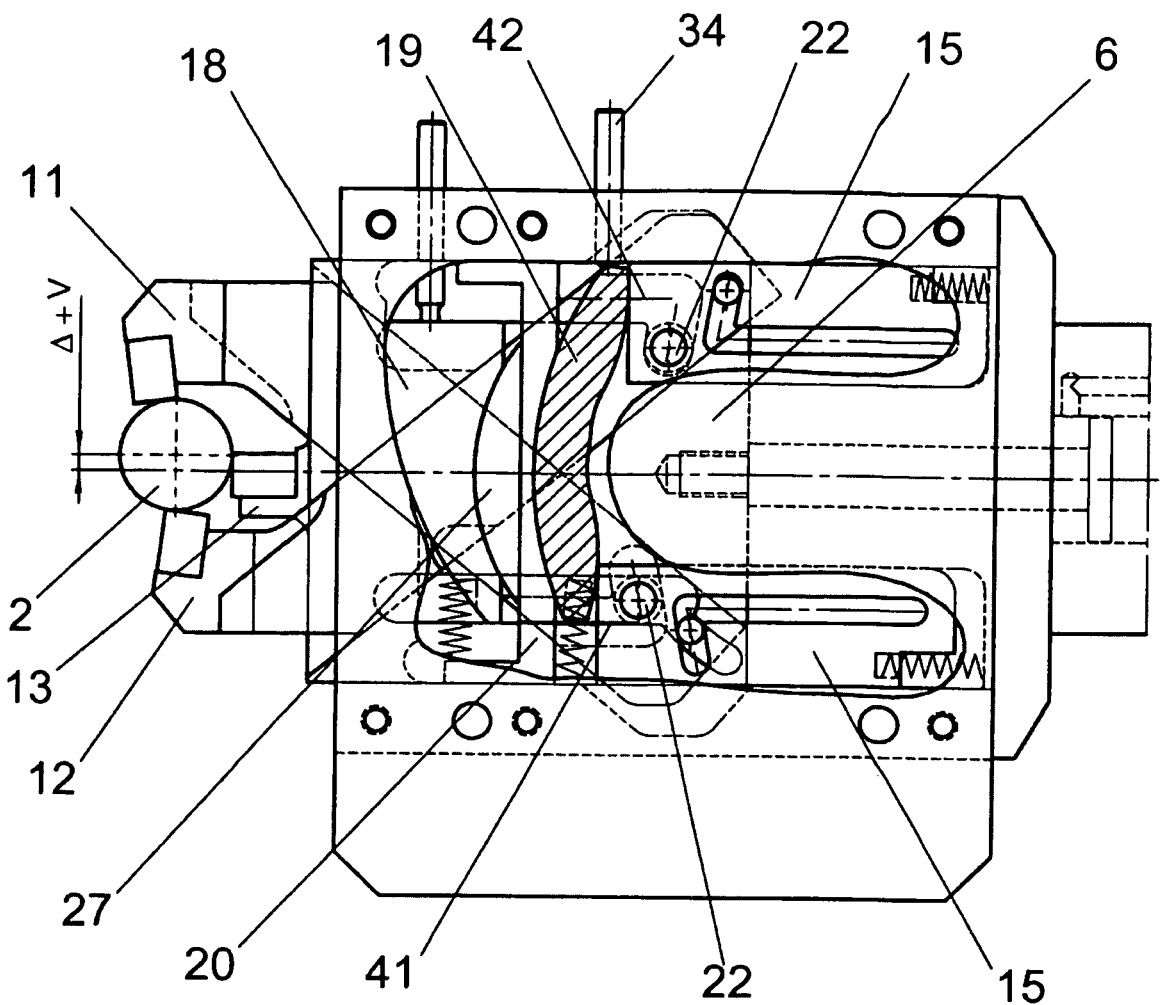
FIGS. 7a and 7b show relative movements of the second half shell shown in accordance with FIG. 3a, shown for vertical centering of the workpiece by means of the two outer steady rest arms, in each case in section.
Figure 7B:
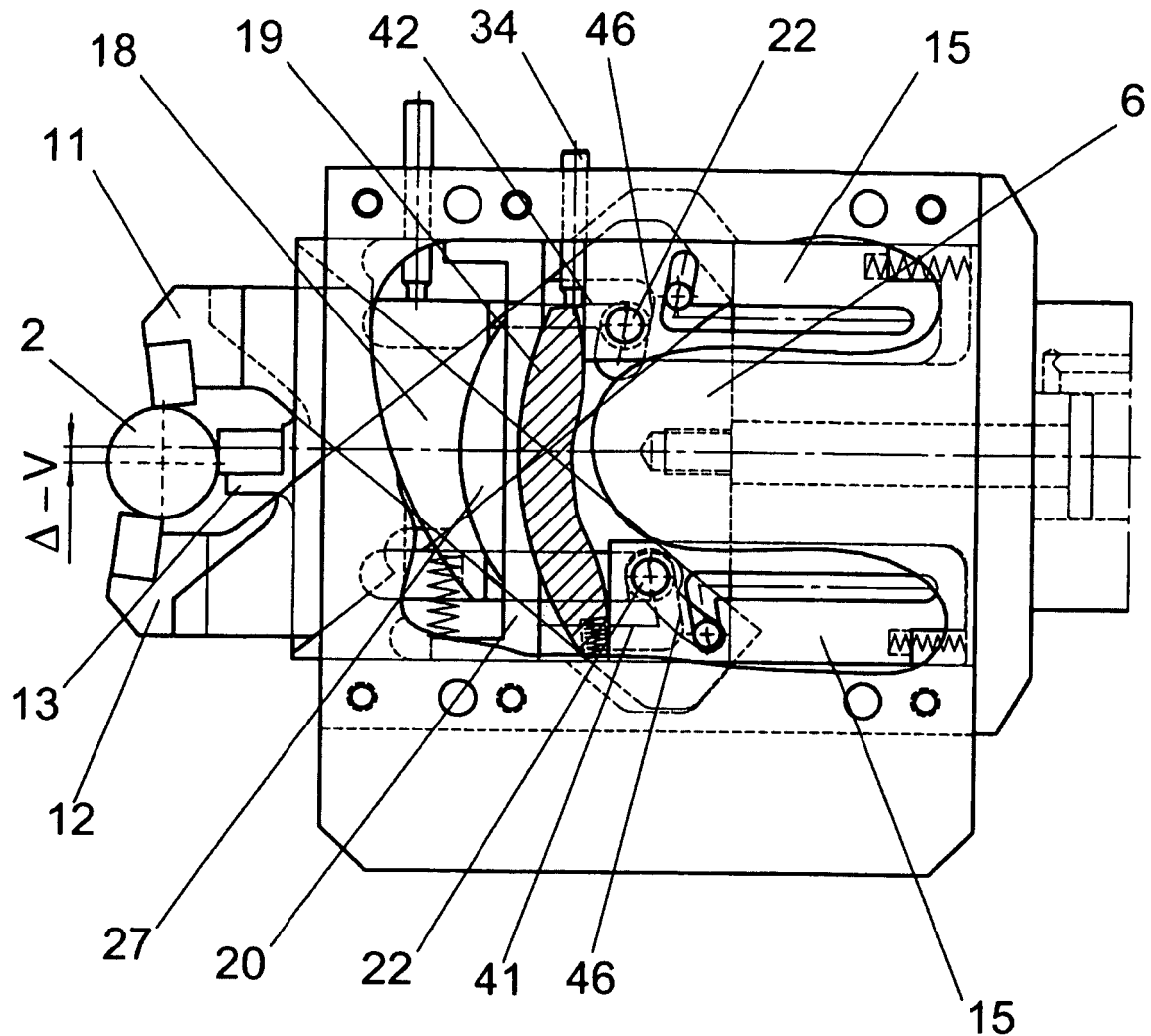

FIGS. 7*a* and 7*b* shows the vertical alignment of the workpiece 2 by means of the two outer steady rest arms 11 and 12. For this purpose, the second half shell 19 can be changed by means of the screw 34 in relation to the U-shaped compensation arm 20 and transversally to the movement direction 3' of the middle piece 6. As a result of the sickle-shaped cross-sectional contour of the second half-shell 19, the distance between the compensation arm 20 and the two guide strips 15 changes synchronously in the opposite direction, which means that the guide strips 15 either run in the middle position flush with one another or, in the setting variants shown in FIGS. 7*a* and 7*b*, offset in relation to one another. This means they adopt a differently sized distance from the compensation arm 20. Consequently, the moment of contact of the control pins 22 fitted to the guide strips 15 changes in the control cams 41 and 42. Due to the different alignment of the control pins 22 in space, they engage in the control cams 41 and 42 of the two outer steady rest arms 11 and 12 at different times and enter into an active connection with the control surface 46 of the corresponding control cam 41 or 42 at different times given a constant advance speed of the middle piece 6, depending on the selected position of the guide strips 15 and 16. In turn, this means that one of the outer steady rest arms 11 or 12 is moved towards the workpiece 2 offset in time from the other steady rest arm 12 or 11 in each case, and then enters into a positive-locking active connection with it.

The positional shift of the workpiece 2 is shown in FIGS. 7*a* and 7*b* in the vertical plane with Δ+V or Δ-V.

The invention claimed is:

1. A steady rest for centering a rotationally symmetrical workpiece (2) in a space,
   the steady rest comprising:
   two housing halves (4, 5) disposed at a distance from one another and connected together,
   a plate-shaped middle piece (6) arranged between the two housing halves (4, 5), the middle piece (6) being mounted in the housing halves (4, 5) by means of an actuator piston (7) such that the middle piece is moveable in an axial direction (3) to the workpiece (2),
   two linear guide grooves (10) disposed in opposite large-surface end faces (6') of the middle piece (6), with the linear guide grooves (10) running in a cross-shaped arrangement and at an angle to a movement direction (3') of the middle piece (6),
   with two outer steady rest arms (11, 12), each of which is provided with a free end (14) mounted in one of the linear guide grooves (10) of the middle piece (6) in a movable arrangement,
   and a middle steady rest arm (13) attached to the middle piece (6) between the outer steady rest arms (11, 12), wherein
   two guide strips (15) are disposed between the two housing halves (4, 5) so as to be axially movable, parallel to, and at a distance from, a lengthways axis (3) of the two housing halves (4, 5), a control pin (22) is disposed projecting at right angles from each guide strip (15) and the control pin (22) faces the middle piece (6), first and second linear guide paths (43, 44) are disposed in the middle piece (6) and spaced apart from one another and disposed in parallel to the lengthways axis (3), and each in line with one of the control pins (22), that a curved control cam (41, 42) is disposed in the free ends (14) of the two outer steady rest arms (11, 12) with each of the control cams (41, 42) extending partially in line with one of the control pins (22), and one of the guide paths (43, 44) of the middle piece (6), the control pins (22) engaging the control cams (41, 42) while the middle piece (6) is moved in a direction of the workpiece (2), the control pins (22) on the inside of the control cam (41, 42) making contact with the workpiece (2) immediately before the steady rest arms (11, 12, 13), the control cams (41, 42) have being provided with a control surface (46) running outwards by means of which the outer steady rest arms (11, 12) are moved outwards for movement of the steady rest arms (11, 12) to the workpiece (2), positions of the guide strips (15) being adjustable in relation to a distance between the guide strips and the workpiece (2) to be clamped, the adjustment taking place by means of a first half shell (18) having a sickle-shaped cross section, and in such a manner that the two outer steady rest arms (11, 12) reach an active connection with the workpiece (1) at the same time as, or offset from, the middle steady rest arm (13), and the positions of the two guide strips (15) being adjustable from an aligned starting position in opposite directions synchronous to one another by means of a second curved half shell (19) with a sickle-shaped cross section.

2. The steady rest in accordance with claim 1, wherein
   the two half shells (18, 19) are arranged in line in a movement direction (3') of the middle piece (6) and are separated from one another by means of a compensation arm (20) supported on one of the two housing halves (4 or 5) adapted for axial movement.

3. The steady rest in accordance with claim 1, wherein
   a guide cam (16) is provided in each of the guide strips (15), a guide pin (21) is attached projecting at right angles from the free ends (14) of the steady rest arms (11, 12) toward the middle piece (6), and the guide pin (21) is inserted in the guide cam (16) of a guide strip (15) in an axially movable arrangement.

4. The steady rest in accordance with one of the aforementioned claim 3, wherein
   the guide cam (16) is formed from a guide path (16') and a recess (16") projecting from the guide path (16') and the recess (16") projects from the guide path (16') at an angle (α) of 10°-85°, and the recess (16") extends substantially parallel to the outwardly projecting control cam of the steady rest arms (11, 12).

5. The steady rest in accordance with claim 3, wherein
   one of the guide paths (44) disposed in the middle piece (6) is provided with a void (45) in which the guide pin (21) of the steady rest arm (11) is moveable.

6. The steady rest in accordance with claim 5, wherein
   in the assembled condition, the outside (24) of the first half shell (18) facing the workpiece (2) is in contact with a contact surface (25) disposed on one of the two housing halves (4 or 5), the contours of the contact surface (25)

and the outside (24) of the half shell (18) correspond to one another, and the half shell (18) is mounted so as to be movable relative to the contact surface (25) and at right angles to the movement direction (3') of the middle piece (6).

7. The steady rest in accordance with claim 6, wherein
the inside (26) of the first half shell (18) opposite to the outside (24) is curved with a constant radius, and a compensation element (27) is in contact with the inside (26) of the first half shell (18) in the assembled condition, with the surface (28) of the compensation element (27) facing the first half shell (18) adapted to the inside contour of the inside (26) of the first half shell (18), and its the opposite surface (29) thereof is flat.

8. The steady rest in accordance with claim 7, wherein
the flat surface (29) of the compensation element (27) makes contact with the compensation arm (20) in the assembled condition, without play in the movement direction (3') of the middle piece (6).

9. The steady rest in accordance with claim 7, wherein
the compensation arm (20) is provided with a U-shaped cross section and a trough (30) with a curved cross section is disposed in the connection web (20') of the compensation arm (20), with the second half shell (19) disposed in the trough (30), and the surface contour of the second half shell (18) corresponds to an inside contour of the trough (30) of the compensation arm (20).

10. The steady rest in accordance with claim 7, wherein
two end faces (32) of the second half shell (19) contact on one of the guide strips (15) in the assembled condition, and form one contact surface (17) for the axial movement of the guide strips (15).

11. The steady rest in accordance with claim 9, wherein
the two guide strips (15) are pressed against the corresponding contact surface (17) of the second half shells (19) by a coiled compression spring (33) under preload and the preload presses the second half shell (19) against the compensation arm (20) which is in turn pressed against the compensation element (27) and the first half shell (18).

12. The steady rest in accordance with claim 9, wherein
the first and second half shells (18, 19) are moveable at right angles to the movement direction (3') of the middle piece (6), by means of screws (34) and coiled compression springs (35) as a counter-force relative to the two housing halves (4 or 5).

* * * * *